US005529315A

United States Patent [19]
Borrino et al.

[11] Patent Number: 5,529,315
[45] Date of Patent: Jun. 25, 1996

[54] TANDEM SEAL ARRANGEMENT FOR MECHANICAL FACE SEALS

[75] Inventors: Thomas Borrino, Glendale Heights; Michaeline G. Kruszynski, LaGrange Park; Gary G. Watanuki, Wheeling; Daniel N. Kozlowski, Naperville, all of Ill.

[73] Assignee: John Crane Inc., Morton Grove, Ill.

[21] Appl. No.: 195,754

[22] Filed: Feb. 14, 1994

[51] Int. Cl.$^6$ ............................................. F16J 15/38
[52] U.S. Cl. ........................... 277/65; 277/3; 277/96.1
[58] Field of Search ............................. 277/3, 58, 59, 277/69, 96, 96.1

[56] References Cited

U.S. PATENT DOCUMENTS

| | | | |
|---|---|---|---|
| 3,588,124 | 6/1971 | Guinard | 277/3 |
| 4,130,287 | 12/1978 | Ritzie | 277/12 |
| 4,212,475 | 7/1980 | Sedy | 277/96.1 |
| 4,290,611 | 9/1981 | Sedy . | |
| 4,482,159 | 11/1984 | Ishitani et al. | 277/3 |
| 4,889,348 | 12/1989 | Amundson et al. | 277/1 |
| 5,145,189 | 9/1992 | Pope | 277/3 |
| 5,249,812 | 10/1993 | Volden et al. . | |

FOREIGN PATENT DOCUMENTS

| | | | |
|---|---|---|---|
| 1330862 | 5/1962 | France | 277/65 |
| 2030133 | 12/1971 | Germany . | |
| 2444544 | 1/1976 | Germany . | |
| 755955 | 9/1975 | South Africa . | |

OTHER PUBLICATIONS

Dulak, J. J. "Sealing Hazardous Gas" Reprinted Grem *Machine Design*, Mar. 8, 1990.
Netzel, J. "Sealing Systems keep pace with the times", Reprint Grem *PEM Plant Engineering and Maintenance*, Jan. 89.
Sales Brochure of Durametallic Corporation, Kalamazoo, MI, "The GB-200 DURA SEAL", 1994.
Brochure, B2.539V CRANPAC GMBH, publ. May 1985 and English version.
Brochure B1.501V CRANPAC, GMBH, publ. Apr. 1985 and English version.
"Compressor Seal Oil Systems", J. Read The South African Mechanical Engineer, vol. 39, Apr. 1989, pp. 176, 180.
John Crane Inc. Drawing No. H-SP-11505, Dated Oct. 11, 1990, Publication or sale date: 1991.
John Crane Inc. Drawing No. H-SP-12582-1, Dated Oct. 11, 1990, publication or sale date: 1991.
John Crane Inc. Drawing No. HS-P-10979 dated May 2, 1990 Publication or sale date; Prior to 1992 and correspondence. detailed drawing labelled Double Type 28 LD.
"Dry Gas Compressor Seals," P. Shah Presented and published of proceedings of the 17 Turbomachinery Symposium, Nov. 1988 in English.

*Primary Examiner*—Daniel G. DePumpo
*Attorney, Agent, or Firm*—Dorn, McEachran, Jambor & Keating

[57] ABSTRACT

A three-part seal comprising an inboard, an intermediate and an outboard seal and defining two chambers, a mixing chamber between the inboard seal and the intermediate seal and a buffer chamber between the intermediate seal and the outboard seal, provides the capability of zero emissions of a process fluid under pressure in a housing. The process fluid may comprise a toxic or otherwise environmentally hazardous process fluid. A radial bore provides fluid communication between the buffer chamber and a buffer fluid reservoir, for example, a source of nitrogen gas, which is maintained at a pressure, preferably about five to eight psi, over the fluid pressure in the mixing chamber. Spiral grooves on at least one ring of the intermediate seal pump the buffer fluid from the buffer chamber into the mixing chamber where it mixes with any leakage of the process fluid and is evacuated through a second radial bore which provides fluid communication between the mixing chamber and a collection pod for collecting and processing the mixed fluid. A method of providing a zero emission seal between a housing and a relatively rotating shaft is also disclosed.

10 Claims, 2 Drawing Sheets

TANDEM SEAL ARRANGEMENT FOR MECHANICAL FACE SEALS

BACKGROUND OF THE INVENTION

1. Field of the Invention

This invention relates generally to mechanical face seals and more particularly, to a mechanical face seal arrangement which is used to seal fluids, especially fluids which may be harmful to the environment, with minimum fluid leakage.

2. Background Art

Mechanical face seals have been used for sealing a variety of devices in which a fluid is sealed in a housing and the housing has an aperture through which a relatively rotating shaft extends. Sealing of the devices is necessary to contain the fluid being sealed which, in certain cases, may present harmful or even dangerous effects to the environment surrounding the sealed housing. In those cases, emissions resulting from fluid leakage must be eliminated as much as possible. A mechanism for maintaining zero emissions regardless of the performance of any one particular component of a seal system is desirable, and preferably, a mechanism for eliminating any hazardous process fluid flow even if one or more of the mechanical face seals of a system fail altogether.

Several dual seal arrangements are described in U.S. Pat. No. 4,290,611 issued to J. Sedy and assigned to a common assignee as the present invention. The dual seal arrangements described therein provide various mechanisms by which the seals maintain leakage from the housing to a minimum. However, none of the dual seal arrangements illustrated in U.S. Pat. No. 4,290,611 is intended for sealing hazardous or environmentally detrimental fluids, and consequently, the seal systems described therein are not adapted to anticipate a catastrophic seal failure of both mechanical face seals. Thus, if both of the seals, or in certain cases, the outboard seals, fail in those systems, at least a small amount of the process fluid is expected to leak into the environment.

A dual seal system in which a buffer fluid is utilized to provide a barrier to leakage of a process fluid is described in U.S. Pat. No. 5,249,812, also assigned to a common assignee as the present invention. U.S. Pat. No. 5,249,812 describes a seal system providing a buffer fluid, such as oil or other liquid lubricant, into a buffer chamber between the two seals of a dual seal system. One feature of this invention is that the mechanical seal face has spiral grooves which pump buffer fluid "upstream" against the process fluid pressure, so that some buffer fluid is injected by the pumping grooves into the process fluid.

The mixing of the sealed process fluid and the buffer fluid is not desirable for specific combinations, and may not be desirable in any event for a specific class of sealed process fluids.

Thus, what is necessary is a dual seal system, or a plural seal system, which provides the features of maintaining zero emission of the sealed process fluid into the ambient environment while simultaneously avoiding the injection of the buffer fluid into the process fluid and evacuating any mixture of process fluid and buffer fluid to a safe area removed from the seal where the mixture can be further processed.

SUMMARY OF THE INVENTION

Accordingly, there is provided a seal system for sealing between a housing and a rotating shaft extending through an aperture in the housing, the housing defining a chamber for containing a fluid under pressure, the seal system comprising an inboard seal being connected to the housing at least at a portion thereof, an intermediate mechanical end face seal having a mating ring and a primary ring, one of which is mounted for rotation with the shaft and the other of which is fixedly connected to the housing, the intermediate seal being position axially of the inboard seal to define a mixing chamber between the inboard and intermediate seals, an outboard seal having at least a portion connected to the housing, the outboard seal being positioned axially of the intermediate seal and defining a buffer chamber between the outboard seal and the intermediate seal, means carried by the intermediate seal for pumping a fluid from the buffer chamber towards the mixing chamber in opposition to fluid leakage from the mixing chamber for mixing the process fluid leakage and the buffer fluid. Also included are a buffer fluid reservoir located externally of the housing in fluid communication with the buffer chamber so as to supply buffer fluid thereto, and a vent in fluid communication with the mixing chamber for removing the buffer fluid and process fluid leakage mixture from the mixing chamber, whereby the process fluid is inhibited from passing across the seal ring faces of the intermediate seal, essentially eliminating leakage of the process fluid to the buffer chamber and to atmosphere. Further, there is provided a method of sealing between a housing and a relatively rotating shaft extending through an aperture in the housing, the housing defining a chamber for containing a process fluid under pressure, the method comprising the steps of providing three seals positioned axially along the shaft relative to each other, an inboard seal being connected to the housing at least at a portion thereof, an intermediate mechanical end face seal having a mating ring and a primary ring, one of which is mounted for rotation with the shaft and the other of which is fixedly connected to the housing, the intermediate seal and the inboard seal defining a mixing chamber therebetween, and an outboard seal having at least a portion connected to the housing, the outboard seal and the intermediate seal defining a buffer chamber therebetween, injecting a buffer fluid from a buffer fluid reservoir disposed externally of the three seals to the buffer chamber through a fluid communication means connecting the buffer chamber and the buffer fluid reservoir, pumping a fluid from the buffer chamber towards the mixing chamber in opposition to fluid leakage from the mixing chamber by a means carried by the intermediate seal, collecting process fluid leaking from the housing which has leaked into the mixing chamber and mixing the process fluid with the pumped buffer fluid, removing the mixed fluid from the mixing chamber through a vent in fluid communication between the mixing chamber and an external collection pod, and further processing the mixed fluid removed to the external collection pod.

DESCRIPTION OF THE PREFERRED EMBODIMENTS

Figure 1:
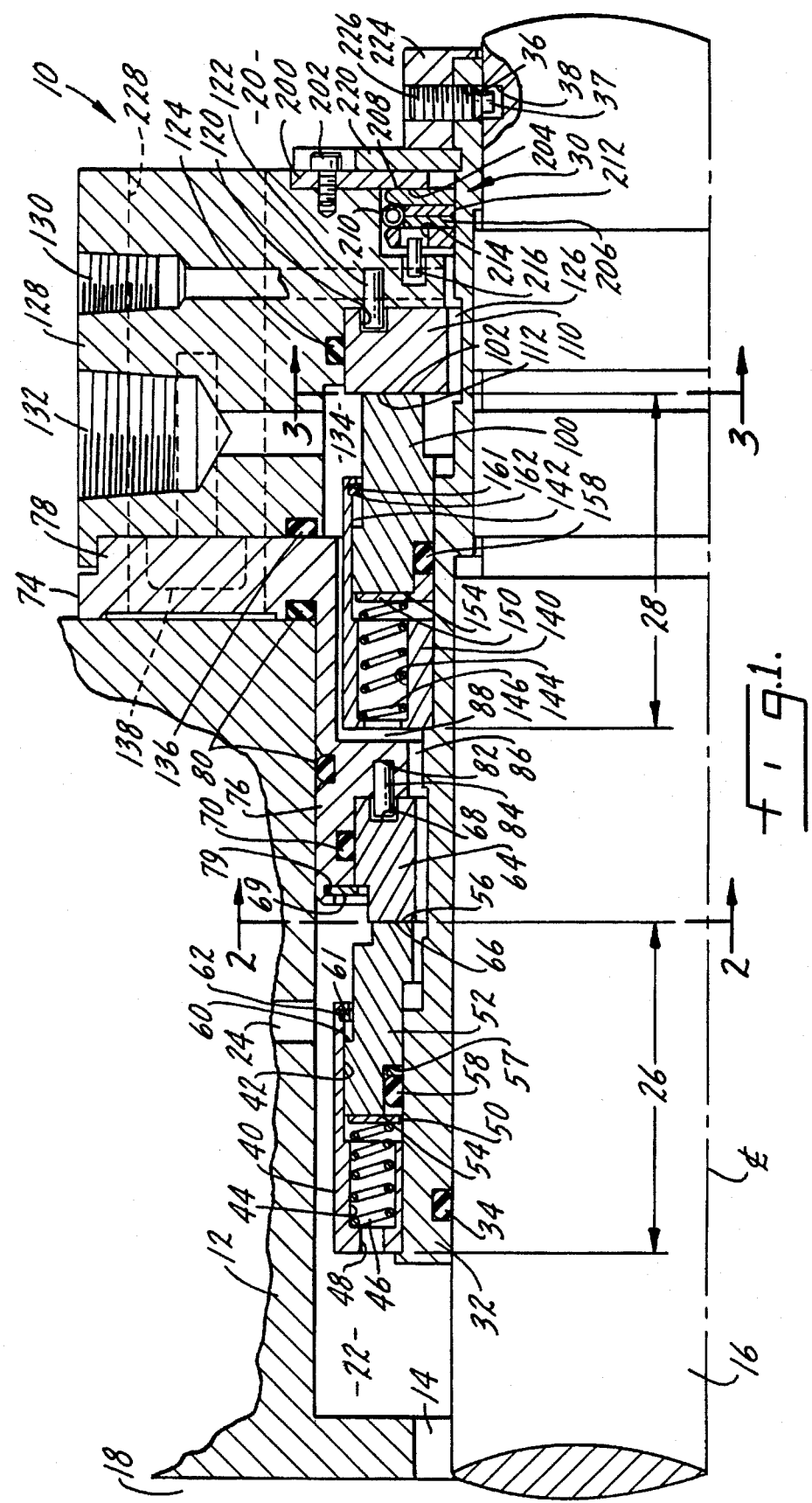
FIG. 1 illustrates in cross-section a seal arrangement according to the present invention.

Illustrated in FIG. 1 is a seal arrangement 10 comprising two mechanical end face seals in a tandem configuration together with a bushing assembly which is adjacent to the atmosphere. The seal arrangement includes various means and inventive features which together provide safeguards against leakage of the sealed process fluid. For purposes of convenience, only one-half of the seal is illustrated by FIG. 1 and it is understood that the full seal would be illustrated below the centerline, indicated by CL in FIG. 1, as a mirror image of the seal half which is shown.

Seal arrangement 10 is an example of one embodiment of the inventive seal arrangement. This particular example includes two spiral groove seals as will be described below. The seal arrangement may be constructed in accordance with other preferred examples which are described below. The seal arrangement 10 is designed to seal toxic and other fluids which are harmful to the environment. Zero emission of the process fluid into the atmosphere is achieved by the inventive seal arrangements described herein. Any process fluid which escapes from a sealed housing is captured and burned or is otherwise disposed of.

The exemplary seal arrangement 10 seals a housing 12 which includes a shaft aperture 14 extending through the housing 12. A shaft 16 extends through the aperture 14 and may be connected at either end to separate operational elements, e.g. a pump and a motor. The housing generally separates a chamber 18 in which is sealed a fluid which is highly toxic or otherwise generally harmful to the environment and must be retained within the housing 12. The seal arrangement 10 seals the shaft 16 against the housing so that no leakage of the process fluid within the housing is permitted to leak into the atmosphere 20 outside of the housing.

In the example seal arrangement 10 illustrated by FIG. 1, the seal arrangement comprises three separate sections which operate together to provide the inventive features of the seal arrangement. The three sections of the seal arrangement 10 comprise a mechanical face, referred to herein as an inboard seal 26, and intermediate seal 28 and an outboard bushing seal 30. The first section is the inboard seal 26 closest to the housing 12 which may also fit within a stuffing box 22 formed by the housing 12. The housing 12 may further comprise an optional bore 24 for providing fluid communication between the stuffing box 22 of the housing 12 and the main chamber 18 for sealing the process fluid.

The elements of the two seals 26,28 which are in a tandem configuration, are standard and comprise known elements used in mechanical face seals. Other standard seals may be substituted for one seal 26, the structure and configuration of the seal 28, together with the adjacent elements, being an inventive feature. Seal 26 may take other forms not shown in the drawings depending on the application of the seal arrangements. For example, the seal configuration may be a double or triple seal, or the seals may be of the contacting type with flat sealing faces on the primary and mating ring. A lip seal (not shown) may also comprise seal 26 for certain applications. Depending on the intended application, a seal 26 may be customized for any seal arrangement 10 to provide desirable structural and operational characteristics. The amount of process leakage through seal 26 may not be of critical importance for a particular seal arrangement because any process fluid which may leak from the seal 26 will be captured or otherwise disposed of, as is described below.

An element which is somewhat different in shape and configuration in the example of seal arrangement 10 is the shaft sleeve 32 which is shaped and dimensioned to conform to the shape of the shaft 16 on the inner diameter and to the various seals and the bushing seal 30 on the outer diameter.

The shaft 16 is illustrated in conformance with a specific device for which the shape of shaft 16 is customized. A shaft sleeve 32 having a customized shape conforming to the diameter of shaft 16 is thus necessary.

The shaft sleeve 32 is sealed to the shaft by an O-ring 34 at the inboard end and comprises a number of steps which follow the shape of the shaft 16 through the shaft sleeve extending into the atmosphere 20 of the housing 12. At the atmosphere end of the shaft sleeve 32, an aperture 36 is included for attaching the shaft sleeve 32 to the shaft 16. The bore 36 is preferably threaded for receiving a set screw 37. The bore 36 is adapted to be placed in line with a threaded bore 38 within the shaft 16 so that a set screw will extend through both bores 36,38 and fix the shaft sleeve 32 relative to the shaft 16 in both the axial and rotational directions.

In the particular example shown in FIG. 1, the inboard seal 26 and the intermediate seal 28 are in many respects similar and comprise similar elements. The main difference between the elements of seal 26 and seal 28 are that the elements of seal 26 have a larger diameter and are more compact radially than are those corresponding elements in the seal 28. The majority of these elements are standard and are generally described in other patents and publications. For example, seal 26 is similar to a seal which is described in U.S. Pat. No. 4,212,475, assigned to a common assignee with this invention, which patent is incorporated by reference herein, for a detailed description of the sealing rings, seal faces and operation of the seal.

Seal 26 comprises a retainer 40 having a cavity 42 including bores 44 extending from the cavity further into the retainer 40 for accepting a number of springs 46 which are adapted to axially bias elements within the cavity 42. The retainer 40 further may have an optional bore 48 which provides fluid communication to the stuffing box 22 so that the process fluid may clean and otherwise provide fluid cooling to the inside of the retainer 40. Multiple springs 46 impinge upon an annular disc 50 which is disposed within the cavity 42 of the retainer 40. The springs 46 are equally spaced apart in the bores 44 so that they provide equal amount of spring force to the annular disc 50 in the axial direction.

A primary ring 52 which is axially movable within the cavity 42 of the retainer 40 is disposed adjacent the disc 50 so that the back face 54 of the primary ring 52 is axially biased by the springs 46 acting through the disc 50. Primary ring 52 further comprises a sealing face 56 which is radially extending and provides the main sealing capability of the seal 26.

A secondary seal is provided by an O-ring 58 which seals the primary ring at a position close to the back face 54 against one of the annular steps of the shaft sleeve 32. The O-ring 58 is disposed in an annular section formed by a shoulder 57 of the primary ring at its back face. A second shoulder 60 at the outer diameter of the primary ring 52 provides a catch for a snap ring 62 disposed in an annular groove 61 the primary ring 52 within the retainer 40. The snap ring 62 prevents the springs 46 from ejecting the primary ring 52 out of the retainer 40 during installation or during operation of the seal.

A mating ring 64 is disposed adjacent and opposite to the sealing primary ring 52. Mating ring 64 includes radially extending sealing face 66 disposed opposite to and in mating relationship to the sealing face 56 of the primary ring 52. The mating ring 64 further includes a back face which has a plurality of bores 68 for providing a mechanism to retain the mating ring stationary relative to the housing 12.

A retaining first gland plate 74 comprising two portions, one an axially extending portion 76 and a flanged radially extending portion 78, abuts the housing 12 and is sealed thereto by an O-ring 80, or by two O-rings 80, as shown. The gland plate provides a means of retaining the first inboard seal within the stuffing box 22 and also provides a bracket for a portion of the seal, the mating ring 64. The mating ring 64 is retained stationary relative to the housing 12.

One or more axial bores 82 within the axially extending portion 76 of the gland plate 74 are provided for insertion of plural pins 84. The pins 84 can also be inserted into corresponding bores 68 of the mating ring 64 to retain and fix the rotational position of the mating ring relative to the housing 12. To fix the axial position of the mating ring 64, a snap ring 69 is also inserted into a corresponding annular groove 79 in the axially extending section 76 and the snap ring 69 retains the mating ring 64 stationary relative to the retaining first gland plate 74. An O-ring 70 is provided to seal the mating ring 64 against the axially extending portion 76 of the gland plate 74.

Figure 2:
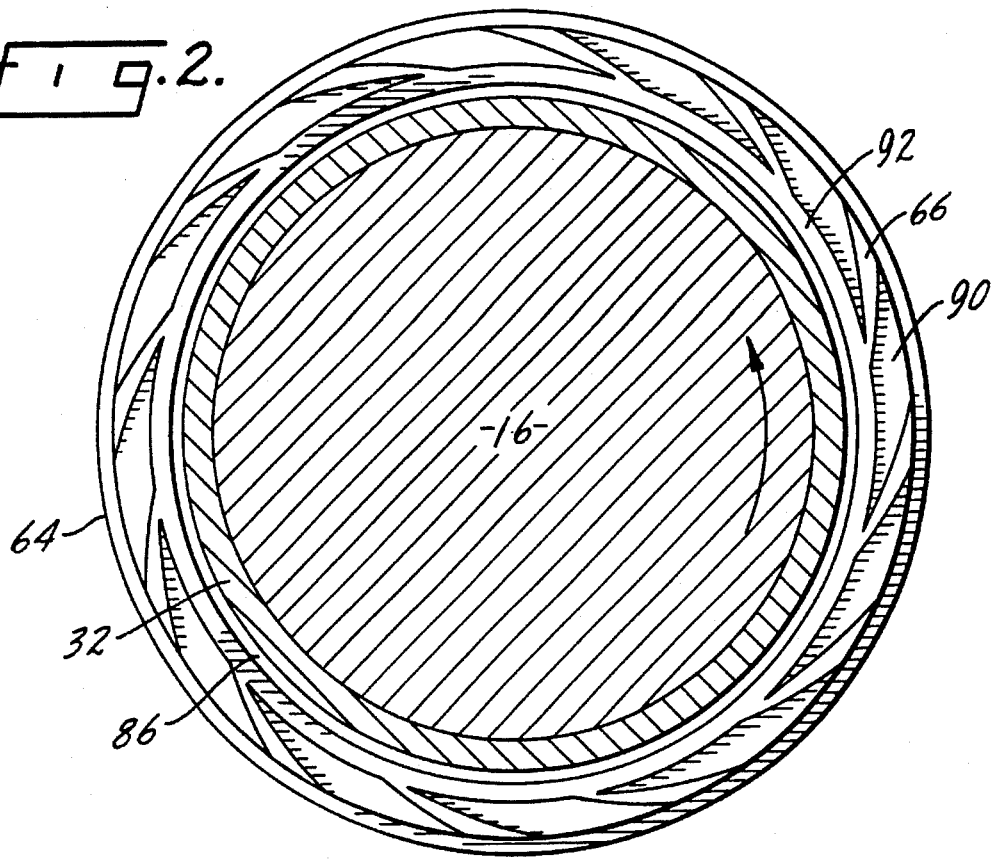
FIG. 2 is a cross-sectional view showing the face of one of the seal rings of one preferred embodiment of this invention taken approximately along 2—2 in FIG. 1.

In the example of FIG. 1, the sealing face 66 of mating ring 64 includes a plurality of spiral grooves 90 extending from one periphery of sealing face 66 toward the other. These grooves 90 are similar to the grooves described in the aforementioned U.S. Pat. No. 4,212,475. FIG. 2 is a cross-sectional end view, taken approximately along line 2—2 of FIG. 1, of the sealing face 66 of seal ring 64 showing the spiral grooves 90. Cross-sections of the shaft 16 and the shaft sleeve 32 are indicated, and the direction of relative rotation of the shaft relative to seal ring 64 is shown by the arrow. A dam 92, shown at the inner diameter of sealing face 66 in FIG. 2, provides a sealing function between the seal rings 52,64, when the shaft is not rotating.

The spiral grooves 90 are shown disposed on the stationary ring, but as is recognized by those of ordinary skill in the art, it is the relative rotation between the rings 64 and 52 which provide for the pumping action of the grooves 90. In other words, even though the primary ring, having a smooth face, rotates in the embodiment shown, the spiral grooves in the sealing face 66 of the mating ring continue to provide a pumping action of the process fluid within the chamber 18 into a gap which is formed by the relatively rotating rings 52,64 as the fluid is pumped between the seal faces 56,66. The seal 26 thus seals to some extent the fluid within the housing 12 which is contained in the chamber 18, with a small amount of process fluid leakage beyond the seal faces into an annular chamber 86 disposed between the inner diameter of the seal rings 52,64 and the shaft sleeve 32.

While this embodiment of the seal arrangement 10 is shown in FIGS. 1 and 2 with an inboard seal 26 having seal rings 52,64 and spiral grooves 90, other embodiments having different configurations are also possible. For example, the mating ring connected to a spiral groove, gap-type seal 26, as shown, may be unnecessary depending on the application of the seal arrangement 10. In certain applications, leakage reduction from the housing 12 is not critical and seal 26 may preferably take other forms. For example, seal 26 may comprise two seal rings of a contacting type seal or a standard lip seal may be used. It is a feature of this invention that any process fluid leakage from the process fluid side is not permitted to vent to atmosphere but is instead recaptured or disposed of by the inventive seal arrangement, as described below.

In the example shown, the seal 28 is similar in most respects to the seal 26, with the obvious exceptions that the elements have a smaller radius in conformance with the smaller diameter of the shaft 16 at that point. The numbering of certain elements of the seal 28 which are similar to corresponding elements of the seal 26 are designated by numerals differing by one hundred. For example, the retainer 140 has an axially extending cavity 142 from which extend bores 144 in which springs 146 are disposed. A disc 150 separates the springs 146 from the primary ring 100. Primary ring 100 does not have a corresponding similar element in seal 26 because the shape is different from the primary ring 52 of the seal 26. The primary ring is sealed against the shaft sleeve 32 by an O-ring 158 and is retained within the retainer 140 by a snap ring 162 which is retained within an annular groove 161 in the retainer 140.

The differences between inboard seal 26 and the intermediate seal 28 reside mainly in the cross-sectional shape of the respective primary rings 52,100, and in the spiral grooves of each of the respective mating ring sealing faces 66,112. Specifically, the radial width of the ring 100 is somewhat greater than that of the radial width of the ring 52. Furthermore, and as shown in FIG. 1, the primary ring 100 has a smaller inner diameter because it is on an axially outboard step of the shaft sleeve 32. The seal arrangement 10 provides for a construction of the seals 26,28 and of the shaft sleeve 32 which permits cartridge installation of the seals 26,28 in successive stages over the shaft sleeve 32.

Seal 28 further includes the mating ring 110 which has a different cross-sectional shape than that of the mating ring 64. Mating ring 110 also provides a radially extending seal face 112 which is in an opposing, mating relationship with the sealing face 102 of the primary ring 100. O-ring 124 seals the mating ring to the gland plate 128.

Figure 3:
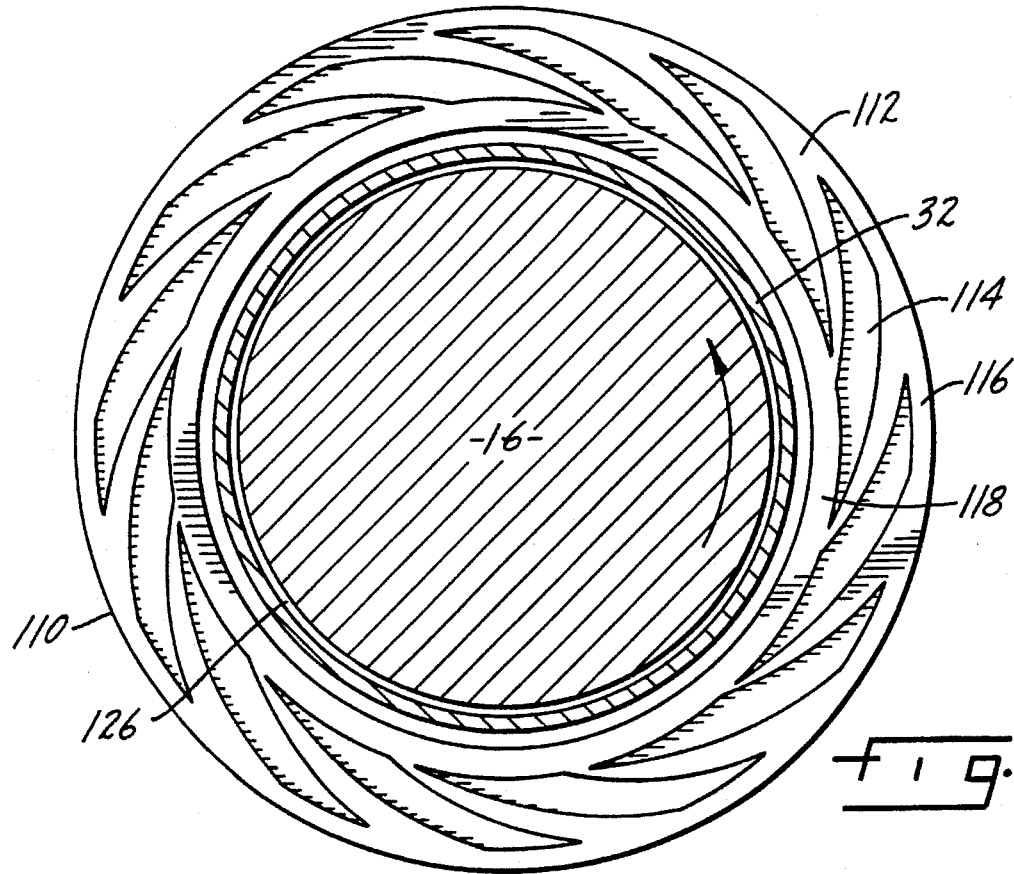
FIG. 3 is a cross-sectional view showing the face of another seal ring according to this invention taken approximately along a line 3—3 in FIG. 1.

As is shown in the end view of the mating ring 110 in FIG. 3, the sealing face 112 of the mating ring 110 has a plurality of spiral grooves 114. Spiral grooves 114 are different from the spiral grooves 90 (FIG. 2) of the inboard seal 26 because the dam 116 is at the outer diameter of the spiral grooves 114. The spiral grooves do not extend to the edge of the sealing face 112, but are truncated at the outer diameter to leave an area of ungrooved surface comprising the dam 116. Adjacent the inner diameter an ungrooved surface 118 sealing face 112 does not comprise a dam because the surface does not come into interfacing contact with the opposite face 102 of the primary ring 100. As can be seen in the cross sectional view of FIG. 1, the sealing face 102 of the primary ring 100 does not extend far enough along the seal face 112 toward the inner diameter thereof; thus, the sealing face 102 does not overlap or interface with the ungrooved area 118 of the sealing face 112. During operation of the seal, the spiral grooves 114 are exposed to the buffer fluid in the buffer chamber 126, and consequently the buffer fluid from the chamber 126 across the seal faces and toward the mixing chamber 134, as is described below.

The mating ring 110 further comprises a plurality of bores 120, one of which is shown in FIG. 1, through which a pin 122 is inserted to fix the position of the mating ring relative to a gland plate 128 both axially and rotationally.

An O-ring 124 seals the mating ring 110 to the gland plate 128. The gland plate 128 provides features of the invention, which are explained below. Gland plate 128 includes a radial bore 130 for the introduction of a buffer fluid to the chamber 126 which is located between the shaft sleeve 32 and the inner seal rings 100,110 of the seal 28. Chamber 126 also referred to as a buffer chamber, is an annular space and the bore 130 opens on to it so that introduction of the buffer fluid, for example, a relatively inert gas such as nitrogen, spreads throughout the chamber 126.

The gland plate 128 further comprises a second radial bore 132 which opens onto a second chamber 134 which is located between the outer diameter of the seal rings of seal 28 and the gland plate 128. The second chamber 134 is a mixing chamber which mixes the buffer fluid and the process fluid flowing from the chamber 86 through a connecting passage 88. During seal operation, the grooves 114 pump the inert buffer fluid from the annular buffer chamber 126 across the sealing faces 102,112 and into the chamber 134. Leakage of process fluid which passes across the seal faces of the inboard seal 26 and into chamber 86 is vented to the mixing chamber 134. The bore 132 is utilized to remove or vent the mixed fluids either to a flare stack or to a collection point for the fluids. An O-ring 136 seals the gland plate 128 against the corresponding inboard gland plate 74. During assembly of the cartridge, the two gland plates are joined together by appropriate means such as a bolt (shown in hidden lines).

Gland plate 128 further provides a mounting for the bushing seal 30 at the outboard side of the device. Bushing seal 30 is a secondary seal and need not perfectly seal the buffer chamber 126 from the atmosphere side 20. However, a good enough seal must be provided such that the buffer fluid introduced into the buffer chamber 126 through the bore 130 at a pressure above atmosphere pressure, does not become contaminated with air or oxygen coming through the bushing 30. The discharge of nitrogen from buffer chamber 126 through the bushing 30 is inconsequential since atmosphere is normally in the range of 78 to 79% nitrogen and discharge into the atmosphere does not present an environmental hazard. Preferably, the pressure of the buffer fluid exceeds atmospheric pressure by about five to eight psi.

The gland plate 128 provides a mounting for an auxiliary gland 200 which is attached to the gland plate by means of cap screws 202. Auxiliary gland 200 is an annular ring which extends around the periphery of the gland plate 128 adjacent the inner diameter thereof. Attaching it to the gland provides for an overhang or lip which extends toward the shaft 16 and which provides a radially extending sealing face 204. The bushing assembly comprising a carbon seal ring 206 provides a radially extending sealing face 208 opposed to and mating with the sealing face 204 of the auxiliary gland. A circumferential garter spring 210 retains the ring 206 adjacent the shaft sleeve 32 so that the inner diameter surface 212 of the bushing ring provides a seal against the outer diameter surface of the appropriate step of the shaft sleeve 32. The bushing ring 206 further includes a bore 214 for insertion of a pin 216 which fixes the rotational position of the bushing ring 206 relative to the housing and the gland plate 128. Axially biasing springs (not shown) are disposed along the gland plate 128 at points equidistantly spaced but separated from the pins 214 so that the springs provide an axial bias to the bushing ring 206, thus maintaining the two sealing faces 204,208 in contact with each other.

In the particular embodiment illustrated in FIG. 1, the seal 30 is a bushing seal. However, other types of seals may be used including a lip seal, a labyrinth seal, a spiral groove seal, or a contacting seal. The bushing seal 30 does not provide a perfect seal for the gases in the buffer chamber 126 but may permit some escape of the buffer fluid through the seal. The important thing is that some impediment to leakage of the nitrogen or other buffer fluid is provided between the buffer chamber 126 to impede free leakage to the atmosphere side 20. Although a perfect seal may not be necessary for purposes of providing isolation of the atmosphere from the buffer fluid chamber 126, a seal 30 is necessary to sufficiently contain the extent of the leakage of buffer fluid into the atmosphere to conserve the buffer fluid and the costs associated therewith. If the buffer fluid comprises nitrogen gas, escape of the nitrogen into the atmosphere does not present an environmental hazard, and nitrogen gas is preferred as the buffer fluid.

Assembly of the cartridge is described in detail below. The retainer 40, including the primary ring 52 is first inserted over the shaft sleeve 32. The retainer 40 has an inner diameter which is significantly larger than is the diameter of the shaft sleeve 32 at the outboard end, shown at the right side in FIG. 1. When it is fully inserted, the last step of the shaft sleeve 32 engages the inner diameter of the retainer 40 and the O-ring 58 seals between the primary ring 52 and the shaft sleeve.

The next step in the process after insertion of the primary ring 52 and retainer 40 is the placement of the mating ring 64 together with the gland plate 74. It is noted that there is clearance between the shaft sleeve 32 and the mating ring 64 to permit the shaft sleeve to rotate without contacting either of the mating ring 64 or the axially extending portion 76 of the gland plate 74. Once the gland plate is in place and it retains the mating ring 64 in its appropriate position, the next step is for insertion of the second seal 28, beginning with the retainer 140 and the primary ring 100. The cartridge comprises basically one unit which is held together by the snap ring 162 and which permits insertion over the shaft sleeve 32 in a similar manner as that of the primary ring 52, retainer 40, cartridge. Of course, because the inner diameter of the retainer 140 and the primary ring 100 is smaller than that of the seal 26, it will not be possible to slide the cartridge beyond the one step for which it is intended. Thus, the inner diameter of the primary ring 100 and of the retainer 140 conforms with the step over which it is inserted so that the O-ring 158 seals the primary ring 100 against that particular step of the shaft sleeve 32.

The final step in the process of assembly of the seal arrangement 10 is the insertion of the gland plate 128 and mating ring 110 over the shaft sleeve, leaving enough clearance for the rotation of the shaft and sleeve as in the case of the seal 26. The proper load on the springs 46,146 is insured by the shape and sizing of the extension of the axially extending portion 76 of the gland plate 74 and gland plate 128.

During the assembly of the seal arrangement 10 on the shaft 16, the unit may be slid over the shaft as a complete cartridge together with all of the gland plates and associated hardware while ensuring that the O-rings 34,80, and 136 are inserted in the respective grooves without tearing so that a seal is effected between the surfaces on either side of these O-rings. The spacer bar 220 is attached to the gland plate 128 by means of cap screws or the like. A spacer bar provides a spacer for the proper spacing of the elements relative to each other.

Following insertion of the shaft sleeve 32 over the shaft 16, the gland plates 74,128 are connected to the housing 12. For example, a bore 228 (shown in hidden lines) is provided through both of the gland plates 74,178 and a stud (not shown) is attached to the housing 12 to fix the gland plates in axial and rotational positions relative to the housing 12. Tightening of the nuts on the studs must be done with care to ensure that the O-rings 80 and 136 seal between gland plate 74 and the housing 12 according to the design of this arrangement.

Once the nuts are tightened, the position of the stationary members of the seal arrangement such as the axially extending portion 76 of gland plate 74 and the mating ring 64, as well as the mating ring 110 and the auxiliary gland 200, become fixed relative to the housing 12. Accordingly, any movement of the primary rings 52,100 and of the bushing ring 206 will be only relative to the shaft 16, because the seal faces 56,66 and 102,112 of each respective seal 26,28 will be in contact with each other. Thus, movement in the axial direction of the shaft sleeve 32 will move the retainers 40 and 140 and the springs 46,146 will provide an axial bias to maintain contact of the seal faces.

The spacer 220 is provided to allow for the correct spacing between the retainers 40,140 and the mating rings 64,110. Axial movement of the shaft sleeve 32 provides a substantially axial biasing force on the primary rings 52,100 by the springs 46,146, respectively. The spacer bar is important for proper setting of the axial bias force of the springs.

The drive collar 224 fixes the axial and rotational position of the shaft sleeve 32, and thus of the retainers 40,140, relative to the shaft 16. The drive collar 224 includes an axial, threaded bore 226 through which set screw 37 is inserted. Bore 226 lines up with the corresponding bore 36 in the shaft sleeve 32 so that insertion of the set screw into the bores 226,36 fixes the position of the drive collar 224 relative to the shaft sleeve 32. One set of bores 226,36 are shown in FIG. 1, but several such sets of bores may be equidistantly spaced around the drive collar and shaft sleeve to reduce stress and ensure the proper spacing.

The particular embodiment illustrated in FIG. 1 shows a bore 38 in the shaft 16 which lines up with the bores 226 and 36 of the drive collar and shaft sleeve respectively. However, the bore 38 is not necessary in the shaft 16 and a set screw which engages the outer diameter surface of the shaft may be sufficient to fix the position of the shaft sleeve 32. Once the drive collar 224 has been connected to the shaft 16, the spacer bar 220 is no longer necessary and it is removed prior to startup operation of the seal arrangement 10.

During operation of the seal arrangement 10, highly toxic process fluid is under pressure in the chamber 18. The process fluid may comprise hydrocarbon fluid or a highly acidic fluid such as hydrofluoric acid. As the shaft 16 rotates, some of the process fluid may escape from the stuffing box 22 through the seal 26 and into the chamber 86 where it passes throughout the passageway to the mixing chamber 134. Simultaneously, nitrogen gas under pressure is being introduced into the bore 130 and into the buffer fluid chamber 126 at a pressure higher than atmospheric pressure, preferably about five to eight psi over the pressure of the fluid within the mixing chamber 134. The pressure in the clean air buffer chamber 126 prevents the process fluid within the mixing chamber 134 from entering the clean air buffer chamber 126. The spiral grooves 114 of the mating ring 110 further impede leakage of process fluid from the mixing chamber 134 by pumping the nitrogen gas from the buffer fluid chamber 126 into the mixing chamber 134 where the process fluid and the nitrogen mix together. Because nitrogen gas is relatively inert, it will not react in any way with the process fluid.

The mixed gas is then withdrawn through the bore 132 and is delivered to a processing station (not shown), such as a flare stack, where it is burned or to a collection station where it is collected for future delivery to a disposal site. Because of the differential in pressure between the buffer chamber 126 which is higher in pressure than the mixing chamber 134, and the upstream pumping of the spiral grooves 114, the process fluid is not permitted to escape from the mixing chamber and can only exit from the mixing chamber through the bore 132. Thus, the process fluid has no opportunity to escape from the seal arrangement 10 and into the atmosphere 20.

When the seal is static, that is, when the shaft 16 is rotating, both the seal 26 and the seal 28 provide a static sealing capacity which isolates the process fluid within the chambers 18,22 and 134. The static seal is provided by the contact of the dams 92,116 against the respective mating faces of the opposing primary rings 52, which contact is expected by the springs 46,146. Moreover, if there is a failure in any of the seals and including the seal 26, the higher pressure of the nitrogen in chamber 126 continues to impede the escape of the process fluid out of the mixing chamber.

The materials which comprise the various elements described above depend on the type and characteristics of the process fluid. For a process fluid such as hydrocarbon or hydrofluoric acid, the materials of the inboard seal 26 may comprise silicon carbide and of the materials for the intermediate seal, the primary ring 100 may be carbon graphite while the mating ring 110 may be silicon carbide. The auxiliary gland may be made from a stainless steel, such as Monel, and the bushing is preferably made from a carbon graphite. The remaining elements such as the shaft sleeve 32, the retainers 40,140, the gland plates 74,128, the drive collar 224 may be made from a stainless steel, such as Monel. And the springs may be made from suitable spring material such as Monel, as long as the materials are essentially impervious to corrosion by contact with the process fluid. The O-rings 34, 58, 70, 80, 124, 136, and 158 may comprise a fluoroelastomer or other elastomeric material, such as Viton. The fluoroelastomer chosen for the O-rings will also depend on the corrosive properties of the process fluid.

The inventive seal arrangement illustrated as an example in FIG. 1 may be changed and modified by those of ordinary skill in the art once the features of this invention are understood. Thus, adaptations and modifications which may be considered equivalent to the invention as described and illustrated are within the inventive concept provided by the applicants. The embodiment described above is illustrative only and does not limit the invention which is only limited by the following claims.

What is claimed is:

1. A seal system for sealing between a housing and a rotating shaft extending through an aperture in the housing, the housing defining a chamber for containing a fluid under pressure, the seal system comprising:

an inboard seal being connected to the housing at least at a portion thereof for providing a seal to minimize leakage of process fluid for the housing;

an intermediate mechanical end face seal having a mating ring and a primary ring, one of which is mounted for rotation with the shaft and the other of which is fixedly connected to the housing, the intermediate seal being positioned axially of the inboard seal to define a mixing chamber therebetween;

an outboard seal having at least a portion connected to the housing, the outboard seal being positioned axially of the intermediate seal and defining a buffer chamber therebetween;

means carried by said intermediate seal for pumping a fluid from said buffer chamber towards the mixing chamber in opposition to fluid leakage from the mixing chamber whereby the process fluid leakage and the buffer fluid mix within the mixing chamber;

a buffer fluid reservoir located externally of said housing in fluid communication with the buffer chamber so as to supply buffer fluid thereto; and a vent in fluid communication with said mixing chamber for removing the buffer fluid and process fluid leakage mixture from said mixing chamber, whereby the process fluid is inhibited from passing across the seal ring faces of the intermediate seal and thereby essentially eliminating leakage of the process fluid to the buffer chamber and to the atmosphere external to the housing.

2. The seal arrangement according to claim 1 wherein said inboard seal further comprises a contacting type mechanical face seal having a primary seal ring, a mating seal ring and a biasing means for biasing said primary ring towards said mating ring to bring the seal faces of said rings into sealing contact with each other.

3. The seal arrangement according to claim 1 wherein said outboard seal further comprises a bushing sealingly fixed to the housing for nonrotational engagement therewith, and an auxiliary gland attached to said housing, a radially extending seal face of said auxiliary gland being in opposite and mating relation to a radially extending seal face of said bushing, said bushing being split and having a garter spring disposed concentrically to said bushing at an outer diameter thereof for maintaining an inner diameter bushing in a sealing relation with said shaft.

4. The seal arrangement according to claim 1 wherein the buffer fluid comprises a relatively inert gas.

5. The seal arrangement according to claim 1 wherein the means for pumping comprise a series of spiral grooves on the seal face of one of the sealing rings of said intermediate seal.

6. A seal combination for sealing between a housing and a relatively rotating shaft extending through an aperture in the housing, the housing defining a chamber for containing a process fluid under pressure, said seal combination comprising:

(a) an inboard barrier seal at least a portion of which is mounted on said housing for providing a seal to minimize leakage of process fluid from the housing;

(b) an outboard barrier seal, at least a portion of which is mounted on said housing, said outboard barrier seal positioned axially along the shaft of said inboard barrier seal;

(c) an intermediate seal positioned axially between said inboard and said outboard barrier seals, said intermediate seal and said inboard barrier seal defining a mixing chamber therebetween and said intermediate seal and said outboard barrier seal defining a buffer fluid chamber therebetween, said intermediate seal comprising a mating seal ring and a primary seal ring, one of which is mounted for rotation with the shaft and the other of which is fixedly connected to the housing, said primary and mating rings each having a radially extending seal face in opposite, mating relation to the seal face of the other sealing ring, at least one of said rings having pumping means for pumping a buffer fluid from said buffer fluid chamber across the seal faces of the seal rings towards the mixing chamber in opposition to fluid leakage from the fluid in the mixing chamber whereby the process fluid leakage and the buffer fluid mix within the mixing chamber;

(d) a buffer fluid reservoir located externally of said housing and in fluid communication with said buffer chamber so as to supply buffer fluid to said buffer chamber under pressure; and (e) a vent in fluid communication with said mixing chamber for removing the process fluid and the buffer fluid mixture from said mixing chamber, whereby the process fluid is inhibited from passing across the seal ring faces of the intermediate seal, and thereby essentially eliminating process fluid leakage to the buffer chamber and to the atmosphere external to the housing.

7. The seal arrangement according to claim 6 wherein said inboard seal further comprises a contacting type mechanical face seal having a primary seal ring, a mating seal ring and a biasing means for biasing said primary ring towards said mating ring to bring the seal faces of said rings into sealing contact with each other.

8. The seal arrangement according to claim 6 wherein said outboard seal further comprises a bushing sealingly fixed to the housing for nonrotational engagement therewith, and an auxiliary gland attached to said housing, a radially extending seal face of said auxiliary gland being in opposite and mating relation to a radially extending seal face of said bushing, said bushing being split and having a garter spring disposed concentrically to said bushing at an outer diameter thereof for maintaining an inner diameter bushing in a sealing relation with said shaft.

9. The seal arrangement according to claim 6 wherein the buffer fluid comprises a relatively inert gas.

10. The seal arrangement according to claim 6 wherein the means for pumping comprise a series of spiral grooves on the seal face of one of the sealing rings of said intermediate seal.

* * * * *